(12) United States Patent
Endemann et al.

(10) Patent No.: US 8,557,207 B2
(45) Date of Patent: Oct. 15, 2013

(54) METHOD AND APPARATUS FOR REDUCING THE QUANTITY OF POLLUTANT IN WASTE GASES

(75) Inventors: Jürgen Endemann, Schermbeck (DE); Jörg Gadinger, Nürnberg (DE)

(73) Assignees: Siemens Aktiengesellschaft, Munich (DE); STEAG GmbH, Essen (DE)

( * ) Notice: Subject to any disclaimer, the term of this patent is extended or adjusted under 35 U.S.C. 154(b) by 0 days.

(21) Appl. No.: 13/587,136

(22) Filed: Aug. 16, 2012

(65) Prior Publication Data

US 2013/0209340 A1  Aug. 15, 2013

(30) Foreign Application Priority Data

Aug. 19, 2011 (DE) .......................... 10 2011 081 282

(51) Int. Cl.
*B01D 53/34* (2006.01)
*B01D 53/56* (2006.01)
*B01D 53/74* (2006.01)
*B01D 53/76* (2006.01)
*G05B 21/00* (2006.01)

(52) U.S. Cl.
USPC .................. 423/239.1; 423/DIG. 5; 422/105; 422/108; 422/111; 422/168; 422/177; 700/266; 700/271

(58) Field of Classification Search
USPC .......... 423/239.1, DIG. 5; 422/105, 108, 111, 422/168, 177; 700/266, 271
See application file for complete search history.

(56) References Cited

U.S. PATENT DOCUMENTS

| | | | |
|---|---|---|---|
| 5,047,220 A | 9/1991 | Polcer | |
| 5,237,939 A | 8/1993 | Krigmont | |
| 6,017,503 A * | 1/2000 | Kato et al. | 423/235 |
| 7,846,405 B2 * | 12/2010 | Lanier et al. | 423/210 |
| 2005/0260761 A1 | 11/2005 | Ahlgren | |
| 2008/0196588 A1 | 8/2008 | Gretta | |

FOREIGN PATENT DOCUMENTS

| | | |
|---|---|---|
| EP | 0239106 A2 | 9/1987 |
| EP | 0866395 A1 | 9/1998 |
| EP | 2161069 A1 | 3/2010 |
| JP | 9000871 A | 1/1997 |

* cited by examiner

*Primary Examiner* — Timothy Vanoy

(57) ABSTRACT

A method and apparatus for reducing the quantity of pollutant in waste gases, in particular for reducing the quantity of nitrogen oxide in the flue gas of a coal-fired power plant is provided. The process includes the steps of, introducing the waste gas into a catalyzer, to which a quantity of catalytic reduction agent is supplied, measuring the quantity of pollutant at the outlet of the catalyzer, and setting the quantity of pollutant to a setpoint value smaller than a limit value to be complied with, by varying the quantity of reduction agent supplied, wherein the setting of the quantity of pollutant is dynamically regulated as a function of mean values over time, for example half-hour or quarter-hour mean values, of the measured quantity of pollutant determined regularly beforehand.

8 Claims, 2 Drawing Sheets

METHOD AND APPARATUS FOR REDUCING THE QUANTITY OF POLLUTANT IN WASTE GASES

CROSS REFERENCE TO RELATED APPLICATIONS

This application claims priority of German application No. 10 2011 081 282.2 DE filed Aug. 19, 2011. All of the applications are incorporated by reference herein in their entirety.

FIELD OF INVENTION

A method and apparatus for reducing the quantity of pollutant in waste gases, in particular for reducing the quantity of nitrogen oxide in the flue gas of a coal-fired power plant as claimed in the claims is provided.

BACKGROUND OF INVENTION

During coal-based power generation in power plants flue gases form, which contain harmful nitrous gases (NOx) in addition to ash particles and other pollutants. In order to comply with statutory limit values, provision has to be made in power plant systems for corresponding measures to reduce the quantity of pollutant in the waste gas.

Thus for example in coal-fired power plants the so-called SCR (selective catalytic reduction) method is used to comply with the required NOx values. With this method a reduction product in the form of ammonia (NH3) is sprayed into the flue gas flow and the resulting mixture is then routed by way of a catalyzer. Nitrogen and steam are thus produced in the catalyzer. This catalytic reaction reduces the NOx concentration in the flue gas. In this process the NOx values are measured at emission points that have previously been officially approved in the system. The half-hour mean values and daily mean values are then calculated from these in an emission computer (EMI computer), registered and forwarded to the competent authorities for analysis.

The NOx values are frequently measured at the outlet of the catalyzer, as it is here that the best control quality can be achieved for regulation-related reasons. However the nature of the system means that the NOx values may be different at the outlet of the catalyzer (measurement point) and at the actual chimney outlet (emission values to be taken into account). Therefore not only is the measurement site different but generally also the quality of the measurement. The official measurement must be calibrated and standardized regularly, while the actual controlled variable does not have to be, which can also produce diverging results.

In order to be able to comply reliably with the emission values required by the legislator, a plant manager must therefore take this into account when setting the setpoint pollutant value, in this instance the setpoint NOx value, at the measurement point. NOx output can also fluctuate as a function of the day and load, so the plant manager will generally select quite a large safety margin between the setpoint value and the permissible limit value. In order always to operate the system within the optimum operating range, the plant manager must therefore constantly adjust the setpoint value as a function of the currently measured values. Until now this was always done manually. Non-optimum operation of the system or too large a safety margin between the set setpoint value and the legally permissible limit value also results in higher ammonia NH3 consumption.

SUMMARY OF INVENTION

The method and apparatus reduce the quantity of pollutant in flue gases, in order to overcome the disadvantages as described above.

This object is achieved with the method for reducing the quantity of pollutant in waste gases, in particular for reducing the quantity of nitrogen oxide in the flue gas of a coal-fired power plant, having the features of the claims, and the corresponding apparatus as claimed in the claims.

By introducing the waste gas into a catalyzer, to which a quantity of catalytic reduction agent is supplied, measuring the quantity of pollutant at the outlet of the catalyzer, setting the quantity of pollutant to a setpoint value smaller than a limit value to be complied with, by varying the supplied quantity of reduction agent, and dynamically regulating the setting of the quantity of pollutant as a function of mean values over time determined regularly beforehand, preferably the half-hour or quarter-hour mean values determined by an emission computer, it is possible to adjust the setpoint pollutant value in a timely manner to the current pollutant values and thus ultimately reduce the margin between setpoint value and permissible limit value. In coal-fired power plants in particular it is thus possible to comply reliably with the required NOx limit values by means of such automatic readjustment of the setpoint NOx value even with a smaller margin in respect of the set limit value and at the same time to reduce the quantity of the ammonia reduction agent.

If the cumulative daily mean value, calculated on the basis of a number of half-hour or quarter-hour mean values already determined during the course of the day or other regularly determined mean values, is also taken into account during regulation, the setpoint value for regulation can be adjusted so that the permissible daily mean value is regulated as accurately as possible. This has the advantage of reducing the workload of the plant manager and also optimizing consumption of catalytic reduction agents to a minimum.

If the number of mean values determined regularly during the day is also taken into account, very simple self-correcting regulation results over the course of the whole day.

If the currently set setpoint value is taken into account during regulation, even smaller iterative approximations to the limit value to be complied with can be achieved.

A regulator configured according to the inventive method therefore simulates the transmission behavior of an emission computer and uses the determined mean values over time (in this instance in particular the half-hour or quarter-hour values) and/or the currently set setpoint value and/or the cumulative daily mean value and/or the number of mean values over time determined regularly during the course of a day to calculate a setpoint value to be set, which is as close as possible to a limit value to be complied with, which is then used by the regulator in the apparatus for regulating the quantity of nitrogen oxide in the flue gas.

DETAILED DESCRIPTION OF INVENTION

Figure 1:
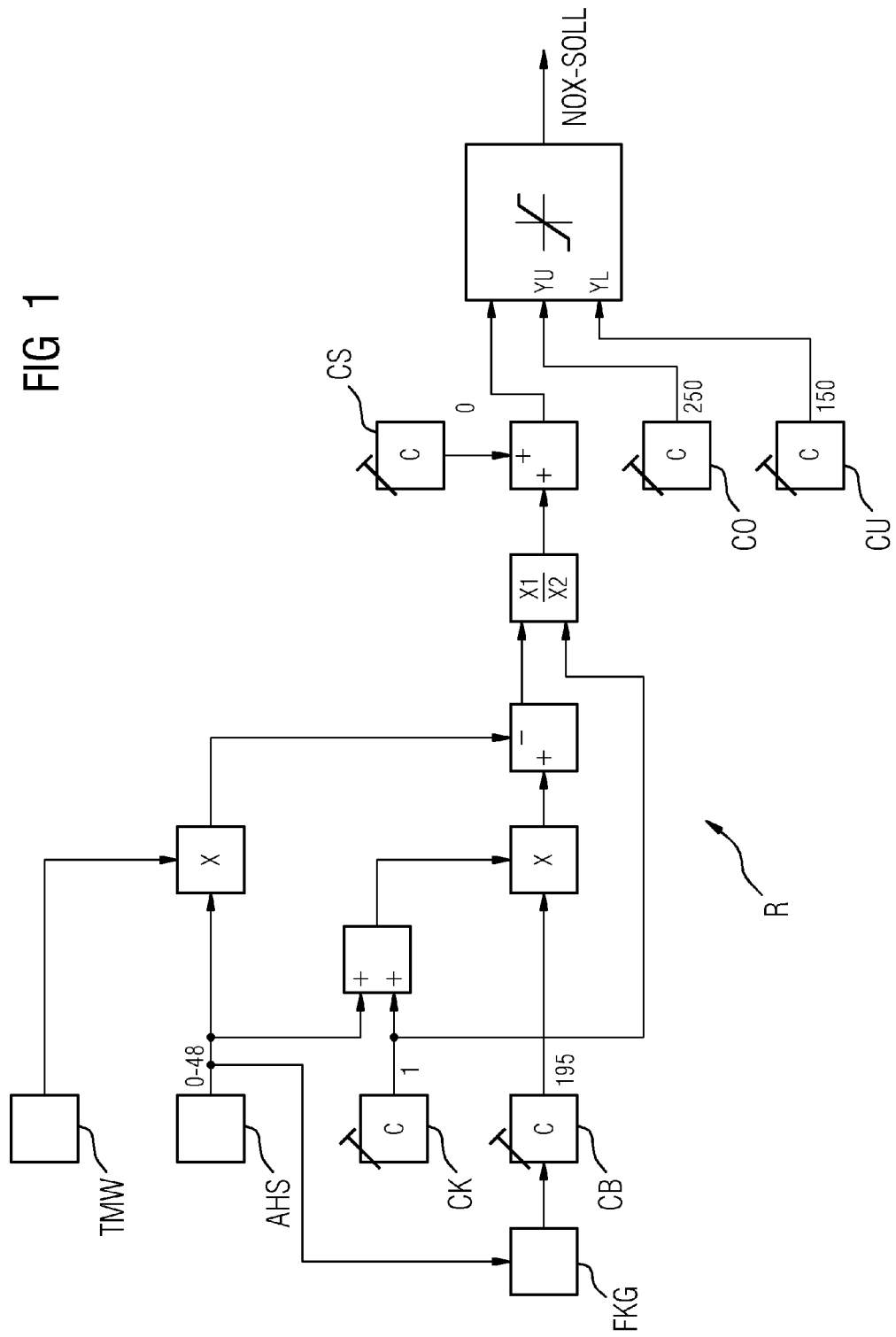
FIG. 1 shows a schematic diagram of an inventive regulator structure.

FIG. 1 shows a schematic diagram of the regulator R for implementing the inventive method steps, in this instance using the example of the setting of the setpoint NOX value "NOX-SOLL" in the flue gas of a coal-fired power plant to a permissible daily mean limit value of 200 mg/Nm$^3$. When the power plant has started up, a certain flue gas temperature must first be reached, before the NOx regulation can be enabled for the first time, as at low temperatures the catalyzer is contaminated by other pollutants, such as NH3 for example. In this start-up phase, during otherwise error-free operation (NH3 supply, pumps, filters, etc. operating correctly), the setpoint operating value CB is initially still managed as a function of the number of half-hour mean values AHS. In this process the operating setpoint value CB is raised by way of the control element FKG from an initial value, which is reliably below the limit value, as a function of the number of cumulative half-hour mean values AHS and therefore increasingly stable regulation, to a settable target value for said operating setpoint value CB of in this instance 195 mg/Nm$^3$. A slip parameter CS can optionally be permanently set or, as shown below in FIG. 2, it can be derived directly from the NOx measurements. A possible difference between the regulated NOx value and the statutory value to be taken into account can thus be corrected.

The upper logic of the regulation plan illustrated in FIG. 1 shows the actual regulation of the quantity of pollutant, in this instance based on the cumulative daily mean value TMW. The correction time here is the number of half-hour mean values AHS in which corrections and therefore readjustments are to be made. In this example the correction time CK=1, in other words the deviation of the daily mean value TMW is to be corrected after every other half hour. The number of cumulative half-hour mean values AHS is used to factorize the correction, in other words the correction is more effective, the more half-hour mean values there are contained in the daily mean value. In an extreme instance, when 47 half-hour mean values have already accumulated, only half an hour remains to correct the error, since a day can only have a maximum of 48 half-hour values. For reliable operation of the power plant, regulation here is optionally limited to a range within the settable limits of CU=150 mg/Nm$^3$ to CO=250 mg/Nm$^3$.

Figure 2:
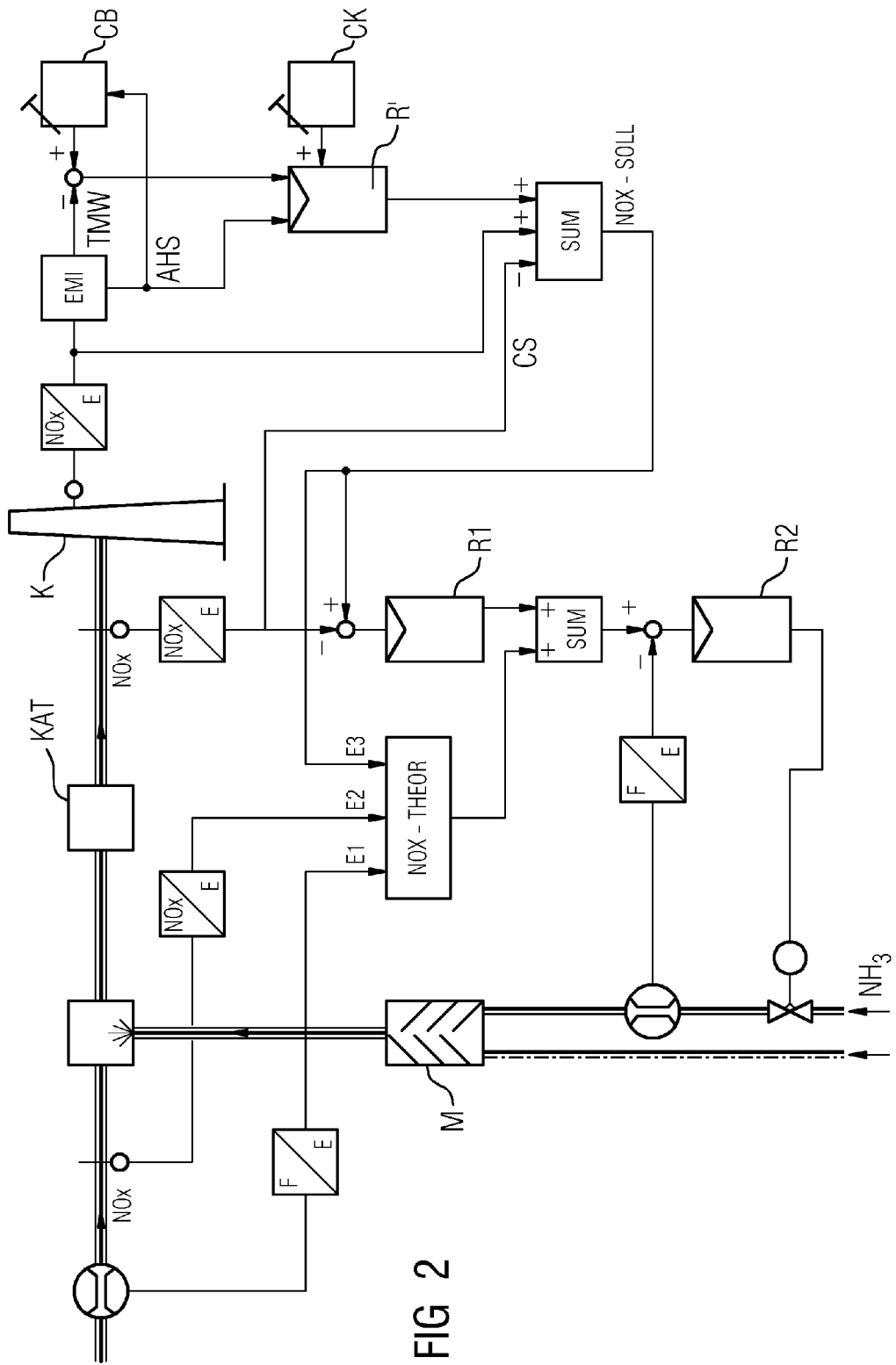
FIG. 2 shows a schematic diagram of a further inventive embodiment of a model regulator incorporated in the waste gas path.

FIG. 2 shows a further inventive embodiment of a model regulator R' incorporated in the waste gas path NOx of a power plant with chimney K. Daily mean value TMW and number of half-hour mean values AHS come from the EMI computer, which is located on the chimney K. The model regulator R' uses the input values, number of half-hour mean values AHS, operating setpoint value CB, correction time CK and cumulative daily mean value TMW, to form the theoretical setpoint value. This theoretical setpoint value, together with the slip parameter CS, which is determined from the waste gas value before the chimney K and the waste gas value in the chimney, forms the set point value "NOX-Soll" to be set. This value is forwarded to a regulator R1, which is to regulate the quantity of NOx after the catalyzer KAT. The regulator R1 then outputs a setpoint value for the quantity of NH3, which is made up of the controlled variable of the regulator R1 and a theoretical NOx value (NOX THEOR), to the lower-level quantity regulator R2, which in turn releases the selected NH3 quantity. This is mixed with air in the mixer M and then sprayed into the waste gas path before the catalyzer KAT. This results in a closed control circuit for the automatic readjustment of the quantity of pollutant so that it is as close as possible to the statutory maximum value.

We claim:

1. A method for reducing the quantity of a pollutant in waste gases, comprising:
   introducing the waste gas into a catalyzer, to which a quantity of catalytic reduction agent is supplied;
   measuring a quantity of the pollutant at the outlet of the catalyzer; and
   setting the quantity of the pollutant to a setpoint value smaller than a limit value to be complied with, by varying the quantity of reduction agent supplied,
   wherein the setting of the quantity of pollutant is dynamically regulated as a function of mean values over time of the measured quantity of pollutant determined regularly beforehand.

2. The method as claimed in claim 1, wherein the regulation takes into account a cumulative daily mean value, which is calculated on the basis of a number of mean values over time determined during the course of the day.

3. The method as claimed in claim 2, wherein regulation also takes into account the number of mean values over time determined during the course of a day.

4. The method as claimed in claim 1, wherein the regulation takes into account the currently set setpoint value.

5. The method as claimed in claim 1, wherein the pollutant is nitrogen oxide in the flue gas and the supplied catalytic reduction agent is ammonia.

6. The method as claimed in claim 1, wherein the mean values over time are determined by an emission computer and are half-hour or quarter-hour mean values.

7. An apparatus for regulating the quantity of pollutant in waste gases, comprising:
   a regulator, which using the method as claimed in claim 1, uses mean values determined over time and/or the currently set setpoint value/or the cumulative daily mean value and/or the number of mean values over time determined during the course of a day to determine and set a quantity of pollutant to be set that is as close as possible to a limit value to be complied with.

8. The apparatus as claimed in claim 7, wherein the regulator further comprises an emission computer which determines regularly the mean values over time, which are half-hour or quarter-hour mean values.

* * * * *